Sept. 15, 1925.
T. W. HUCKLE
1,553,692
DRAFT APPLIANCE
Filed April 26, 1924
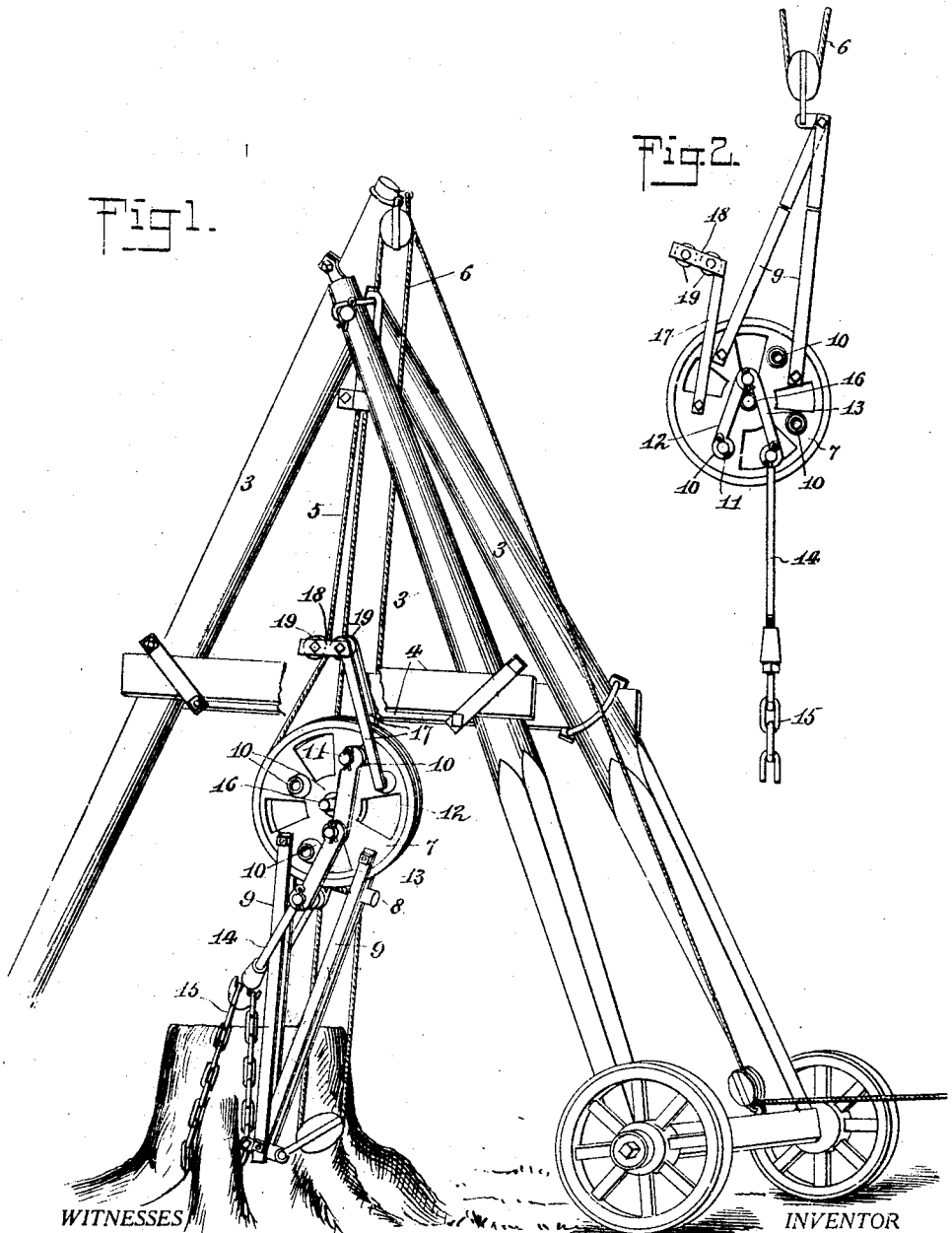
INVENTOR
T. W. Huckle.

Patented Sept. 15, 1925.

1,553,692

UNITED STATES PATENT OFFICE.

THOMAS WILLIAM HUCKLE, OF FERNDALE, MICHIGAN.

DRAFT APPLIANCE.

Application filed April 26, 1924. Serial No. 709,249.

*To all whom it may concern:*

Be it known that I, THOMAS W. HUCKLE, a citizen of the United States, and a resident of Ferndale, in the county of Oakland and State of Michigan, have invented a new and Improved Draft Appliance, of which the following is a full, clear, and exact description.

This invention relates to improvements in draft appliances, and has particular reference to a stump pulling mechanism.

The present invention is designed particularly as an improvement over my former Patent No. 840,942, dated January 8th, 1907, and has for one of its objects to support the sheath and connected parts in proper position preparatory to the application of power to the appliance and during the operation thereof.

Another object is to provide a simple, practical and efficient mechanism which greatly facilitates the removal of tree stumps and the like.

The above and other objects will appear more clearly from the following detailed description, when taken in connection with the accompanying drawing, which illustrates a preferred embodiment of the inventive idea.

In the drawing—

Figure 1 is a perspective view of the appliance used as a stump puller; and

Figure 2 is a side elevation of a portion of the mechanism showing the same in its operated position.

Referring more particularly to the accompanying drawing, the numeral 3 designates a plurality of supports which converge upwardly and are held together by transverse braces 4 secured thereto. Suspended from the upper ends of the supports 3 is a supporting cable or other flexible member 5 with which is associated the tackle, generally indicated by the numeral 6, which is utilized for applying power to the mechanism to pull a stump or lift a weight of any description.

The sheath 7 forming a part of the mechanism of the present invention has a grooved periphery and is connected to the lower end of the supporting cable 5 at 8 in such manner that when the sheath is rotated in one direction the same will travel along the cable 5 which then engages in the groove in said sheath. Secured at adjacent ends to the sheath 7 and depending therefrom in converging relation when the sheath is in its normal position are a plurality of arms 9 the lower ends of which are connected to the tackle 6. Thus when the tackle 6 is operated it will be apparent that the arms 9 will be pulled around in a counterclockwise direction, as viewed in Figure 1, with the result that the sheath 7 will be rotated and caused to move upwardly along the supporting cable. The sheath is provided with a plurality of bossed orifices 10 one of which is at the center of the shield while the others are arranged at varying distances from said center for a purpose which will presently appear. Connected to the uppermost orifices 10, as shown in Figure 1, by means of a pin 11 are a pair of links 12 which straddle the sheath. The opposite end of each link 12 is in turn pivotally connected to a similar link 13 on the same side of the sheath and to the lower ends of the latter links there is pivotally connected a sling 14 designed to support a chain 15 or other flexible element which is conveniently attached to the stump or other weight to be lifted. In order to vary the lifting power applied to the stump when the tackle 6 is operated, a pin 16 is removably placed in any one of the orifices 10 and, as shown in the drawing, this pin is engaged in the center orifice. When the sheath is rotated, as previously described, either set of links 12 or 13 will engage the pin 16 which then forms a fulcrum about which the links will turn, as indicated in Figure 2. As so far described the construction is substantially the same as that set forth in the above-mentioned patent.

The present invention provides means to support the sheath and its connected parts in the position shown in Figure 1, particularly while the mechanism is not being operated and preparatory to its attachment to the stump to be pulled. Preferably this supporting means is utilized in connection with the supporting cable 5 and consists of a pair of links 17 straddling the sheath 7 and pivotally connected thereto at adjacent ends. The opposite free ends of said links have bars 18 extending laterally therefrom in which are rotatably mounted the rollers 19 which receive therebetween the cable 5, the intermediate portions of the links 17 normally engaging the orifice 10 to which the links 12 are connected. By this construction it will be apparent that the sheath and the arms 9 will be supported in the position shown in Figure 1 and with the lower portion of the cable 5 will be maintained in the grooved periphery of said sheath. Also it will be obvious that as the shield is rotated, as previously described, the supporting means including the links 17 and rollers 19 will move along the cable 5 and provide a guide which will prevent side movements of the sheath with respect to the cable and thus at all times maintain said cable in the groove of said sheath while the device is being operated.

What is claimed is:

1. A draft appliance including a sheath, a flexible supporting member connected thereto and along which the sheath is capable of moving, a sling, a flexible connection between said sheath and sling, and a supporting and guiding device connected to said sheath and engageable with said flexible supporting member.

2. A draft appliance including a sheath, a flexible supporting member connected thereto and along which the sheath is capable of moving, a sling, a flexible connection between said sheath and sling, and a supporting and guiding device pivotally connected to said sheath and engageable with said flexible supporting member to support and guide said sheath.

3. A draft appliance including a sheath, a flexible supporting member connected thereto and along which the sheath is capable of moving, a sling, a flexible connection between said sheath and sling, a supporting and guiding device including links pivotally connected at adjacent ends to said sheath, and rollers carried by the opposite ends of said links and between which said flexible supporting member extends whereby said sheath is supported and guided in its movements.

4. A draft appliance including a sheath, a flexible supporting member connected thereto and along which the sheath is capable of moving, a sling, a flexible connection between said sheath and sling, a pin adjustably mounted on the sheath and capable of engagement with said flexible connection, and a supporting and guiding device connected to said sheath and engageable with said flexible supporting member.

THOMAS WILLIAM HUCKLE.